US009457966B2

(12) United States Patent
Issing

(10) Patent No.: US 9,457,966 B2
(45) Date of Patent: Oct. 4, 2016

(54) TRAY-HANDLING STATION AND METHOD FOR MANUALLY LOADING AND UNLOADING OF TRAYS

(71) Applicant: SSI Schaefer Noell GmbH Lager-und Systemtechnik, Giebelstadt (DE)

(72) Inventor: Elmar Issing, Giebelstadt (DE)

(73) Assignee: SSI Schäfer Noell GmbH Lager—und Systemtechnik, Giebelstadt (DE)

( * ) Notice: Subject to any disclaimer, the term of this patent is extended or adjusted under 35 U.S.C. 154(b) by 104 days.

(21) Appl. No.: 13/924,785

(22) Filed: Jun. 24, 2013

(65) Prior Publication Data

US 2013/0306434 A1 Nov. 21, 2013

Related U.S. Application Data

(63) Continuation of application No. PCT/EP2011/073955, filed on Dec. 23, 2011.

(30) Foreign Application Priority Data

Dec. 23, 2010 (DE) .................. 10 2010 056 520

(51) Int. Cl.
*B65G 1/06* (2006.01)
*B65G 47/52* (2006.01)
*B65G 1/137* (2006.01)

(52) U.S. Cl.
CPC .............. *B65G 47/52* (2013.01); *B65G 1/06* (2013.01); *B65G 1/1378* (2013.01); *B65G 2207/46* (2013.01)

(58) Field of Classification Search
CPC B65G 47/52; B65G 1/1378; B65G 2207/46; B65G 1/06
See application file for complete search history.

(56) References Cited

U.S. PATENT DOCUMENTS

| 4,244,448 A | * | 1/1981 | Matheny, III | ........ B65G 1/1378 186/55 |
| 5,215,421 A | * | 6/1993 | Smith | ....................... B65G 1/08 193/2 R |

(Continued)

FOREIGN PATENT DOCUMENTS

| DE | 103 13 576 A1 | 10/2004 |
| DE | 10 2006 025 617 A1 | 11/2007 |

(Continued)

*Primary Examiner* — Thomas Randazzo

(74) *Attorney, Agent, or Firm* — Renner, Otto, Boisselle & Sklar, LLP

(57) ABSTRACT

A tray-handling station for manually loading or unloading piece goods on or from a tray, comprising a tray-conveyor system including a handling position for buffering at least one tray; a working area including at least partially a packing station, or a piece-good conveyor system; and a sliding-surface unit defining a handling plane together with the to-be-handled tray, the handling plane being arranged adjacent to the tray-conveyor system and the packing station, or the piece-good conveyor system; wherein the working area includes the handling position, at least partially, and is dimensioned such that a person moves, during removal of one of the piece goods from the tray located at the handling position, which serves as removal position, the piece good from the tray to a discharging area, which is located within the working area and which, at least partially, overlaps the packing station, or the piece-good-conveyor system, only by moving his/her upper body without a lift.

16 Claims, 8 Drawing Sheets

(56) References Cited

U.S. PATENT DOCUMENTS

| | | | | |
|---|---|---|---|---|
| 5,395,206 A * | 3/1995 | Cerny, Jr. | ............ | B65G 1/1378 414/270 |
| 5,983,648 A | 11/1999 | Mörchen | | |
| 6,607,066 B1 * | 8/2003 | Andersen | ............. | B65G 17/345 198/370.04 |
| 7,047,710 B2 | 5/2006 | Winkler | | |
| 7,735,625 B2 * | 6/2010 | Schafer | ................ | B65G 1/1378 198/370.09 |
| 7,766,151 B2 * | 8/2010 | Schaefer | ............. | B65G 1/1378 198/370.01 |
| 7,988,406 B2 | 8/2011 | Schäfer | | |
| 8,082,059 B2 * | 12/2011 | Schaefer | ............. | B65G 1/1373 700/217 |
| 8,622,199 B2 * | 1/2014 | Windfeld | ............. | B65G 41/005 198/588 |
| 8,634,954 B2 * | 1/2014 | Schafer | ................ | B65G 1/1378 700/216 |
| 8,671,649 B2 * | 3/2014 | Schafer | ................ | B65G 1/1378 53/237 |
| 8,707,658 B2 * | 4/2014 | Schafer | ................ | B65G 1/1378 414/267 |
| 8,827,619 B2 * | 9/2014 | Schafer | ................ | B65G 1/1378 414/268 |
| 8,851,827 B2 * | 10/2014 | Burgstaller | .......... | B65G 1/1378 414/807 |
| 2008/0118337 A1 * | 5/2008 | Vestergaard | ............. | B64D 9/00 414/340 |
| 2009/0129902 A1 | 5/2009 | Schäfer | | |
| 2009/0136328 A1 | 5/2009 | Schäfer | | |
| 2009/0136333 A1 * | 5/2009 | Schafer | ................ | B65G 1/1378 414/807 |
| 2009/0139188 A1 | 6/2009 | Schäfer | | |

FOREIGN PATENT DOCUMENTS

| | | |
|---|---|---|
| DE | 10 2006 025 618 A1 | 11/2007 |
| DE | 10 2006 025 619 A1 | 11/2007 |
| DE | 10 2006 025 620 A1 | 11/2007 |
| DE | 10 2006 039 697 A1 | 3/2008 |
| EP | 0 583 859 A1 | 2/1994 |
| WO | 98/06646 A1 | 2/1998 |
| WO | 2008/022767 A1 | 2/2008 |
| WO | 2010/090515 A1 | 8/2010 |

* cited by examiner

TRAY-HANDLING STATION AND METHOD FOR MANUALLY LOADING AND UNLOADING OF TRAYS

CROSSREFERENCES TO RELATED APPLICATIONS

This application is a continuation application of the international patent application WO 2012/085271 A1 (PCT/EP2011/073955) filed on Dec. 23, 2011, which claims priority of the German patent application DE 10 2010 056 520.2, filed on Dec. 23, 2010. Both afore-mentioned applications are incorporated fully herewith by reference.

BACKGROUND OF THE INVENTION

The present invention relates to a tray-handling station for manually loading or unloading of piece goods on or from a tray, in particular on or from a layer tray, wherein the tray-handling station is arranged adjacent to a packing station, or a piece-good conveyor system. The present invention also relates to a storage and order-picking system have such a tray-handling station. Further, the present invention relates to a method for loading or unloading a piece good on or from a tray in a storage and order-picking system having a tray-handling station for manually handling the piece goods.

RELATED PRIOR ART

Recently, with piece-good picking one has proceeded to handle to-be-picked piece goods layerwise, with regard to material flow, in the order-picking system, and in particular by one sort only, in particular in the field of food retail. Pallet layers of one sort only, consisting of a plurality of piece goods of the same type or the same sort, are depalletized layer-by-layer from goods-receipt pallets and are transferred to trays. Such layer trays are stored in tray warehouses and are retrieved for the purpose of order-picking, as known in the field of order picking from containers. Such systems are described in the documents DE 10 2006 025 620 A1, DE 10 2006 025 619 A1, DE 10 2006 025 617 A1, and DE 10 2006 025 618 A1.

The document WO 98/06646 A1 discloses a method and installation for preparing the shipment of frozen goods. All the goods are transferred from a full palette into storage tubs which are stored in a low-temperature tub storage area. From this tub storage area the storage tubs are directed to a loading zone for removal of the goods outside the low-temperature zone.

The document EP 0 583 859 A1 discloses a device for removing articles from trays of a rack warehouse.

In many cases an automation degree of 100% is aimed for. For this purpose, the layer trays are loaded and unloaded in an automated manner, and the piece goods are separated. Then, these piece goods are combined, again in an automated manner, for example, by means of packing robots, on shipping carriers (e.g., pallets) to form new piece-good stacks. Separation processes are exemplarily described in the documents DE 10 2006 039 697 A1 and WO 2010/090515.

Besides automation degree of 100% in a storage and order-picking system a need still exists for also conducting individual steps manually. This particularly concerns the loading and unloading of the (layer) trays and the forming of piece-good stacks (packing) on the shipping carriers. However, if the trays have very large dimensions, which are suitable for receiving one pallet layer, or piece-good rows, or the like, wherein the piece-goods themselves can be huge and heavy, the work steps associated therewith are often very physically exhausting to the order-picking person.

Further, strict regulations with regard to ergonomics at work stations, where piece goods are manually handled in the picking area, exist in particular in the northern European countries.

Therefore, it is an object to provide a tray-workstation for handling such large trays, where the order-picking person manually unloads the piece goods, and, if necessary, manually loads order carriers or shipping carriers. The strict ergonomical guidelines need to be observed in this context.

SUMMARY OF THE INVENTION

A first aspect of the invention relates to a tray-handling station for manually loading or unloading piece goods on or from a tray, wherein the tray handling station is couplable to a packing station or a piece-good conveyor system, comprising: a tray-conveyor system comprising a handling position for buffering at least one tray, which is to be handled; a working area including at least partially the packing station or the piece-good conveyor system; and an ergonomically formed and arranged sliding-surface unit defining a handling plane together with the to-be-handled tray, particularly together with an upper edge thereof, the handling plane being arranged adjacent to the tray-conveyor system and adjacent to the packing station or the piece-good conveyor system; wherein the working area includes the handling position, at least partially, and is dimensioned such that an order-picking person moves, during removal of one of the piece goods from the to-be-handled tray located at the handling position, which serves as removal position, the to-be-removed piece good from the to-be-handled tray to a discharging area, which is located within the working area and which, at least partially, overlaps the packing station or the piece-good-conveyor system, only by moving his/her upper body without a lift; and wherein a tilting device is preferably provided, which tilts the to-be-handled tray or the to-be-removed piece good relative to a substantially horizontally orientated main-conveying plane such that the order-picking person can push and/or pull the to-be-removed piece good over a sliding surface of the sliding-surface unit, which is located in the handling plane, in a substantially stepless manner from the to-be-handled tray to the discharging area.

A second aspect of the invention relates to a tray-handling station for manually loading or unloading piece goods by an order-picking person on or from a tray, wherein the tray-handling station is coupled to a packing station, or a piece-good conveyor system, comprising: a tray-conveyor system comprising a handling position for buffering at least one tray, which is to be handled and carries the piece goods; a working area including, at least partially, the handling position, and the packing station or the piece-good conveyor system; and an ergonomically formed and arranged sliding-surface unit having a sliding surface and defining a handling plane together with the to-be-handled tray, the handling plane being arranged adjacent to the tray-conveyor system, and adjacent to the packing station or the piece-good conveyor system; wherein the working area is dimensioned so that the order-picking person moves, during removal of one of the piece goods from the to-be-handled tray located at the handling position, which serves as removal position, the to-be-removed piece good from the to-be-handled tray over the sliding surface, which is located in the handling plane, to a discharging area, which is located within the working area and which, at least partially, overlaps the packing station or the piece-good-conveyor system, only by moving his/her upper body without a lift.

The workstation of the invention is known for high ergonomics. The order-picking person actually does not need to lift loads. During transfer of the piece goods the order-picking person is assisted by the sliding surface. The order-picking person has a great overview of the to-be-handled piece goods, in case the trays are orientated obliquely. The order-picking person pushes or pulls the to-be-transferred piece goods from a starting point to an endpoint. The sliding surface connects the starting point to the endpoint. The order-picking person actually does not need to walk during the transfer of the piece goods. It is sufficient to slightly rotate his/her upper body.

With a preferred embodiment a tilting device comprising a tilting-forward device and tilting-back device which are integrated into the tray conveyor system such that they are preferably arranged upstream and downstream relative to the handling position.

This measure ensures that the trays are not only tilted within the working area of the order-picking person, but are already entering the working area in a tilted state. Also the tilting back is performed outside the working area of the order-picking person. In this sense the trays "flow" in a clocked manner past the order-picking person. This increases the picking performance by reducing the cycle time needed for exchanging trays.

Further, it is advantageous to tilt a bottom of the to-be-handled tray relative to the main-conveying plane such that the piece goods can slip towards the order-picking person.

In this case, the order-picking person does not need to stretch, in order to be able to transfer such piece goods which are possibly located outside his/her working area. These piece goods automatically slide into the working area, where the order-picking person can grasp and transfer them without problems.

With another preferred embodiment the tilting device further comprises a ramp, which can be lifted and lowered, reaching through the to-be-handled tray and being tilted oppositely to the tray.

In particular, the ramp is of great help with trays having a high rim extending circumferentially. The ramp allows removal of piece goods from the trays without requiring the order-picking person to lift the piece goods for overcoming the height difference between the bottom of the tray and an upper edge of the rim of the tray.

In particular, the tilting device comprises an array of rollers, which define a transport plane and which reach through a bottom of the to-be-handled tray such that the transport plane is tilted relative to the main-conveying plane.

This measure ensures that even such piece goods can be moved without a lift onto the sliding-surface unit which are arranged in a rear area of the tray located outside of a core of the working area. The array of rollers represents kind of a ramp, which is used for overcoming the circumferential rim.

Preferably, the sliding-surface unit is flush-coupled to the tray-conveyor system as well as to the piece-good conveyor system, or packing station.

A flush connection between the tray-conveyor system and the sliding-surface unit prevents gap formation between these components. Gaps are disadvantageous, because the to-be-transferred piece goods can get jammed under certain circumstances.

Further, it is preferred that the sliding-surface unit comprises two legs, which enclose an angle of about 10 degree to about 170 degree.

The tray-conveyor system and the piece-good conveyor system can also couple to each other in almost any arbitrary angle. The sliding-surface unit can be arranged without problems with its legs between both of the conveyor systems.

In particular, the sliding-surface unit comprises a skirt, which is substantially orientated vertically and ends with an edge of the sliding surface in a flushed manner, the edge facing the order-picking person.

With such an arrangement edges projecting towards the order-picking person are avoided. The order-picking person cannot hit the sliding-surface unit. The risk of injuries is minimized. Highest ergonomical requirements are met.

With another preferred embodiment the sliding surface (handling plane) decreases from the tray-conveyor system towards the piece-good conveyor system, or the packing station.

Thus, there is a downgrade between the elements, between which the piece goods need to be transferred. During transfer of the piece goods from the tray-conveyor system towards, for example, the piece-good conveyor system the order-picking person is assisted by gravity. The order-picking person does not need to expand much energy on pulling and/pushing the piece goods.

Further, it is advantageous to move the tray-conveyor system in a clocked manner, at least within the working area, and to define the handling position by a section of the tray-conveyor system where the to-be-handled tray rests during removal or delivery of one of the piece goods.

Preferably, each of the trays has a circumferential rim.

Thereby, it is ensured that the piece goods cannot slip-off laterally from a transport surface (tray bottom) of the tray.

Additionally, it is advantageous to adapt each of the trays to receive of pallet layer, or pallet row, of piece goods.

In accordance with another aspect of the invention a storage and order-picking system is proposed having a tray warehouse and a tray-handling station in accordance with the invention.

According to a fourth aspect, the invention is defined by a storage and order-picking system having a tray warehouse and a tray-handling station, the tray-handling station comprising: a tray-conveyor system comprising a handling position for buffering at least one tray, which is to be handled and carries the piece goods; a working area including, at least partially, the handling position, and the packing station or the piece-good conveyor system; and an ergonomically formed and arranged sliding-surface unit having a sliding surface and defining a handling plane together with the to-be-handled tray, the handling plane being arranged adjacent to the tray-conveyor system, and adjacent to the packing station or the piece-good conveyor system; wherein the working area is dimensioned so that the order-picking person moves, during removal of one of the piece goods from the to-be-handled tray located at the handling position, which serves as removal position, the to-be-removed piece good from the to-be-handled tray over the sliding surface, which is located in the handling plane, to a discharging area, which is located within the working area and which, at least partially, overlaps the packing station or the piece-good-conveyor system, only by moving his/her upper body without a lift According to a fifth aspect of the invention it is disclosed a method for loading or unloading piece goods on or from a tray in a storage and order-picking system having a tray-handling station, comprising the steps of: conveying a to-be-handled tray to a handling position of tray-conveyor system; providing a to-be-handled piece good within a working area of an order-picking person so that the order-picking person can transfer the piece good only by moving his/her upper body without a lift; preferably actuating a tilting device for orientating the to-be-handled tray or piece good, obliquely; and pulling and/or pushing the piece goods over a sliding surface of a sliding-surface unit to a discharging area, located within the working area, wherein the pulling and/or pushing occurs in a stepless handling plane.

According to a sixth aspect of the invention it is disclosed in a storage and order-picking system having a tray-handling station for manually loading or unloading piece goods by an order-picking person on or from a tray, wherein the tray-handling station is coupled to a packing station, or a piece-good conveyor system, which tray-handling station comprises: a tray-conveyor system comprising a handling position for buffering at least one tray, which is to be handled and carries the piece goods; a working area including, at least partially, the handling position, and the packing station or the piece-good conveyor system; and an ergonomically formed and arranged sliding-surface unit having a sliding surface and defining a handling plane together with the to-be-handled tray, the handling plane being arranged adjacent to the tray-conveyor system, and adjacent to the packing station or the piece-good conveyor system; wherein the working area is dimensioned so that the order-picking person, during removal of one of the piece goods from the to-be-handled tray located at the handling position, which serves as removal position, moves the to-be-removed piece good from the to-be-handled tray over the sliding surface, which is located in the handling plane, to a discharging area, which is located within the working area and which, at least partially, overlaps the packing station or the piece-good-conveyor system, only by moving his/her upper body without a lift, a method for loading or unloading the piece goods on or from the tray comprising the steps of: conveying the to-be-handled tray to the handling position of the tray-conveyor system; providing the to-be-handled piece good within the working area of the order-picking person so that the order-picking person can transfer the piece good only by moving his/her upper body without a lift; and pulling or pushing the piece goods over the sliding surface of the sliding-surface unit to the discharging area located within the working area, wherein the pulling or pushing occurs in a stepless handling plane.

It is clear that the above-mentioned and hereinafter still to be explained features cannot only be used in the respectively given combination but also in other combinations, or alone, without departing from the scope of the present invention.

BRIEF DESCRIPTION OF THE DRAWINGS

Embodiments of the invention are illustrated in the drawings and will be explained in more detail in the description below, wherein.

DESCRIPTION OF PREFERRED EMBODIMENTS

Figure 1:
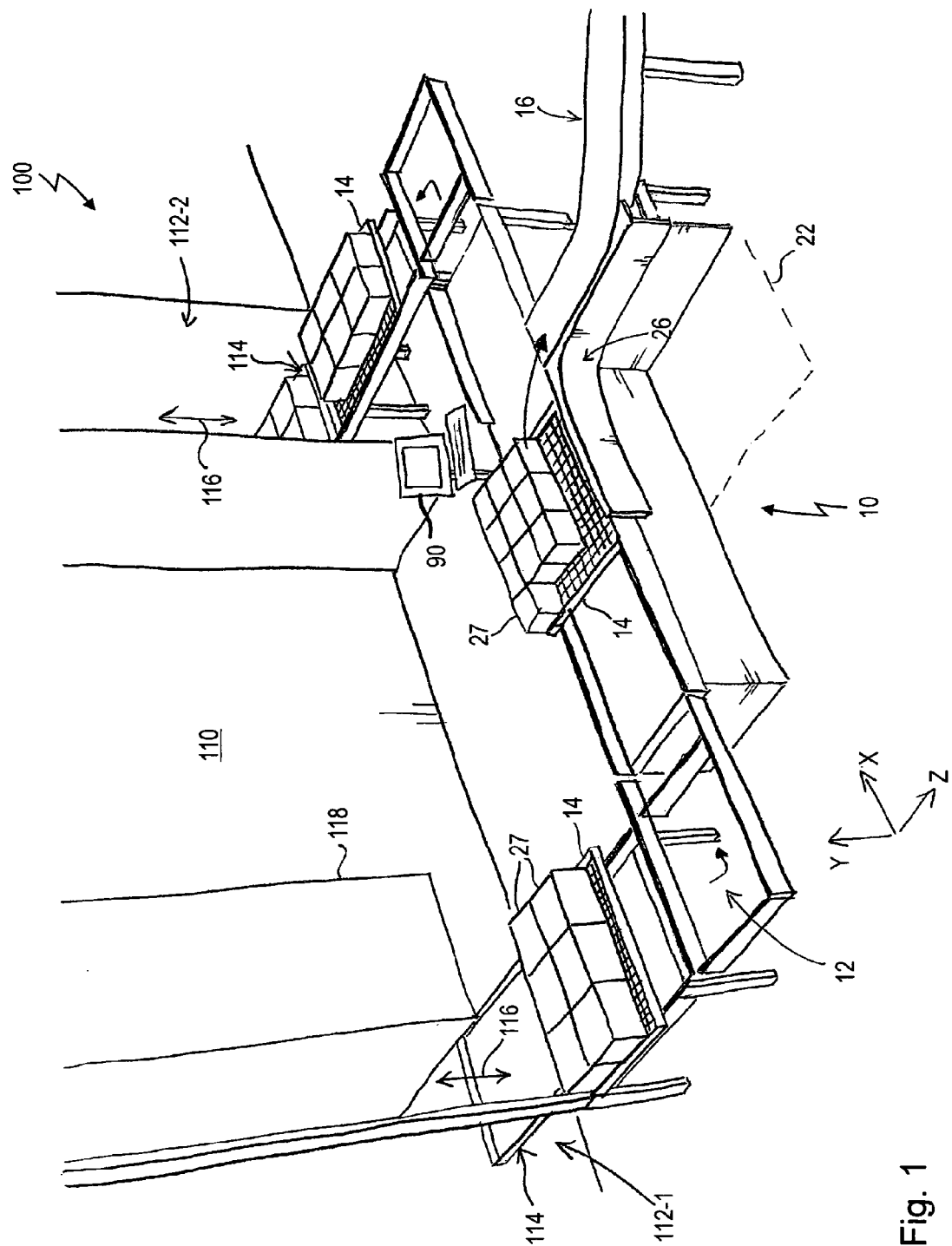
FIG. 1 shows a perspective view of a storage and order-picking system having a tray-handling station in accordance with the invention.

FIG. 1 shows a perspective view of a storage and order-picking system 100 (hereinafter also briefly called "system") having a tray-handling station 10 in accordance with the invention, which is hereinafter also briefly called as "station" 10.

The system 100 comprises a tray warehouse 110, to a longitudinal side of which (or to a not shown front phase of which) one or more vertical elevators 112 are connected directly. Two vertical elevators 112-1 and 112-2 are shown in FIG. 1, which respectively comprise at least one load-handling device 114 allowing exclusively vertical transport of trays 14 and exchange in a transversal direction. A vertical extends in FIG. 1 along the axis Y. The transversal direction extends in FIG. 1 along the axis Z. The longitudinal direction extends in FIG. 1 along the axis X. The elevators couple directly to the tray warehouse 110 and are arranged stationary. Further explanation of the structure of the system 100 can be found in the German patent application DE 10 2006 025 620 A1, which was filed on May 24, 2006 and the entire content of which is incorporated herewith by reference.

The left elevator 112-1, for example, is further provided with a so-called rucksack-warehouse 118 which is arranged oppositely to the tray rack 110 so that the load-handling device 114 can exchange trays 14 either with the tray warehouse 110 or the rucksack-warehouse 118. Of course, it is also possible that no one, some, or all of the elevators 112 have a rucksack-warehouse 118.

The load-handling devices 114 of both of the elevators 112-1 and 112-2 are respectively shown in a handing-over position, allowing the load-handling devices 114 to exchange trays 14 with a tray-conveyor system 12. The tray-conveyor system 12 is exemplarily formed in terms of a belt conveyor. It is clear that other types of conveyor systems such as roller conveyors, chain conveyors, or the like can be used instead of a belt conveyor. The conveyor system 12 is suitable for transporting loaded trays 14 having an overall weight of respectively up to 250 kg or more. However, the tray-conveyor system 12 is to be selected such that so-called layer trays can be conveyed as well. One layer tray is typically loaded with one pallet layer consisting of a plurality of piece-goods 27. The piece goods 27 are preferably provided by one sort only, i.e. one pallet layer consists of a plurality of piece goods of an identical type. The pallet layers are generated by depalletizing layer by layer from (goods-in) pallets (being loaded by one sort only) and by transferring the depalletized pallet layers on the trays 14. Further details with regard to generation and handling of pallet layers in a storage and order-picking system are described in the German patent application DE 10 2006 025 618 A1 which is entirely incorporated by reference herewith. It is clear that the trays 14 can also be loaded alternatively by smaller subunits of one pallet layer such as a row of piece goods.

The trays 14 are typically made of metal, comprise a bottom, which has openings and has a circumferential rim 62 (see also FIG. 3), and are suitable for carrying loads of up to 250 kg and more. Base areas of the trays 14 preferably correspond to base areas of the goods-in pallets.

Returning to FIG. 1 the first elevator 112-1 delivers, for example, entire or partially loaded trays to the tray-conveyor system 12. The tray-conveyor system 12 conveys the trays 14 (in a clocked manner) to the station 10, where piece goods 27 are removed manually and transferred, for example, to a piece-good conveyor system 16, as indicated in FIG. 1 by means of an arrow which is not designated in more detail. The to-be-removed number of pieces is indicated to the order-picking person 20, which is not shown in FIG. 1, by means of a display 90, as exemplarily shown in FIG. 1 in terms of a computer having a screen. If removal of the piece good 27 is completed, the tray 14 is conveyed towards the second elevator 112-2, which stores back the empty, or still partially loaded, tray 14 in the tray warehouse 110.

Figure 2:
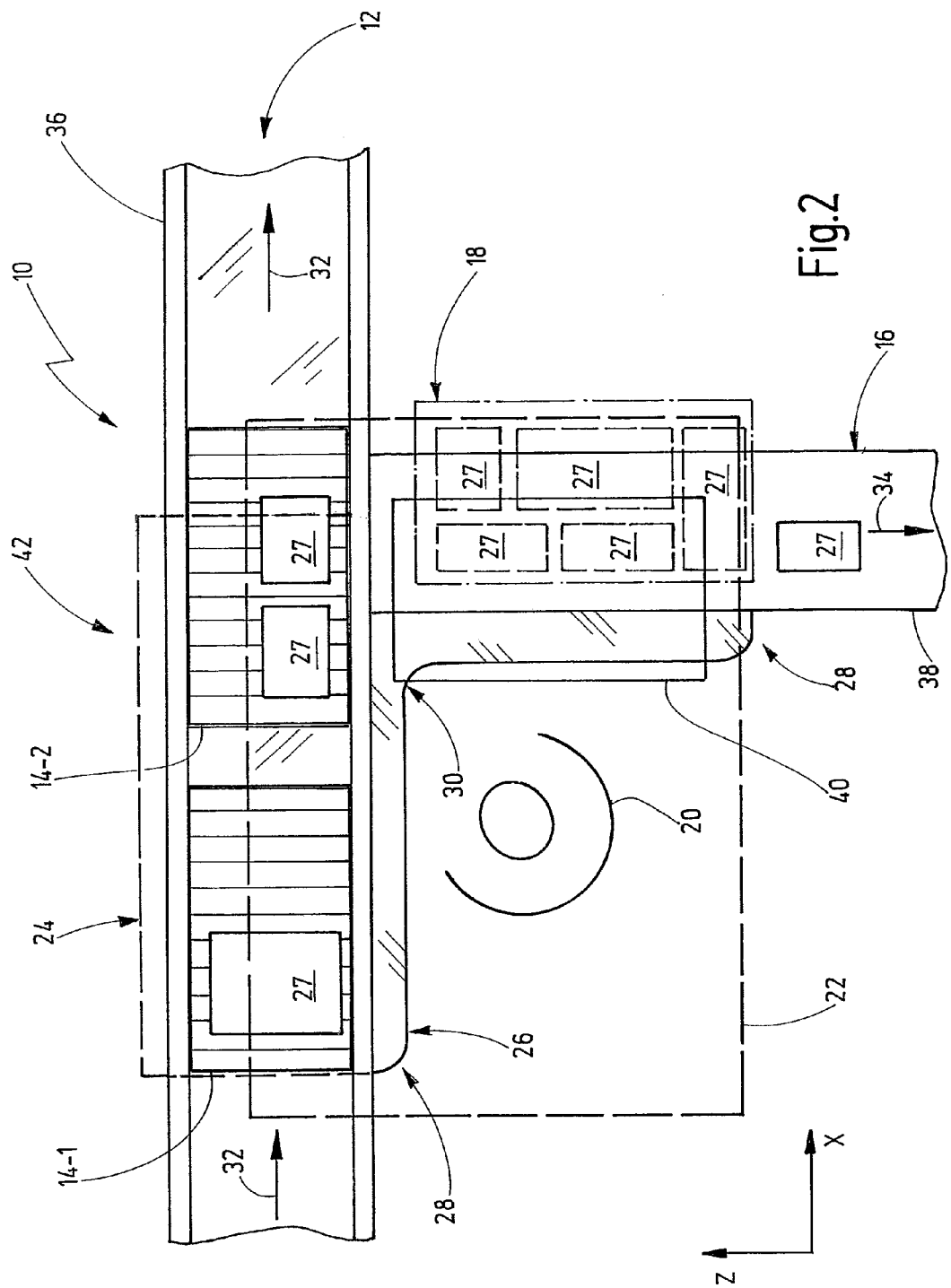
FIG. 2 shows a top view of a tray-handling station of the invention.

It is clear that also a packing station 18 can be provided instead of the piece-good conveyor system 16, the packing station 18 being indicated in FIG. 2 by means of a dot-dashed line. Further, it is clear that the station 10 does not only allow removal of piece goods 24 from the trays 14, but also allows the piece goods 27 to be loaded onto the trays 14 by inverting the material flow. This is particularly advantageous if the stations 10 have order-picking idle phases during times of low work load. During these idle phases the stations 10 can be used for storing piece goods 27 or for refilling the tray warehouse 110 with piece goods 27. In general, all steps are monitored, controlled, and coordinated by means of a superordinated control (material flow computer, warehouse management computer, etc.).

Referring to FIG. 2 a schematic illustration of the tray-handling station 10 of FIG. 1 is shown.

The station 10 is supplied with trays 14 by means of the tray-conveyor system 12 (conveying direction 32). The trays 14-1 and 14-2, which are shown in FIG. 2, are so-called "slat trays", whereas FIG. 1 shows so-called "grid trays". The openings in the bottoms of the trays 14 allow reaching through of handling units such as a separation device shown, for example, in the German patent application DE 10 2006 039 697 A1. The shape, number, and contour of the recesses can be selected by the customer. Alternatively, trays 14 can be used, bottoms of which can be lifted, i.e. the bottoms are lying loosely within a circumferential rim of the trays which in turn forms the rim 62 of the tray 14.

As an alternative to the piece-good conveyor system 16 which, for example, can convey unloaded piece goods 27 in a conveying direction 34 away from the station 10, one or more packing stations 18 can be arranged within an immediate environment of a working area 22 of one of the order-picking persons 20. A packing station 18 is indicated in FIG. 2 by means of a dot-dashed line and typically comprises several side walls, which can be used as a stacking hopper. Within the packing station 18 a shipping carrier such as a pallet of the Europool-type is provided for loading thereon the removed piece good 27. The shipping carrier, which is also called an order carrier, is lowered step-by-step while the order-picking person 20 builds a stack on the shipping carrier consisting of unloaded piece goods 27. A corresponding lifting device, which is not shown in FIG. 2, is provided for this purpose at a level beneath the station 10 (cf. FIG. 4).

A picking process is exemplarily described below, wherein the piece goods 27 are manually removed from the trays 14.

For this purpose, the tray-conveyor system 12 conveys the trays 14 in a conveying direction 32 into the working area 22 of the order-picking person 20. In the present case, the trays 14 are put, for example, on belts 36 of a belt conveyor. The trays 14 are transported to a handling position 24 by means of the tray-conveyor system 12. The handling position 24 can receive one or more of the trays 14 and represents a region, where the trays 14 are temporarily parked for the removal or deposition of the piece goods 27. In FIG. 2 the handling position 24 is surrounded by a dashed line and includes about one and a half trays 14. The handling position 24 overlaps with the working area 22, which is also surrounded by a dashed line in FIG. 2 and which is substantially defined by a movement space of the order-picking person 20.

The working area 22 is indicated in FIG. 2 by a rectangular base area. It is clear that the working area 22 can comprise an arbitrarily shaped contour. The size of the base area of the working area 22 is selected such that the order-picking person 20 can take the piece goods 22 well from the trays 14-1 and 14-2, if possible without the need to walk or stretch. Typically, the contour of the working area 22 is defined by a range of arm of the order-picking person 20. Since the order-picking person 20 does actually not walk during removal of the piece goods 24, during loading the trays 24 with the piece goods 27, but substantially moves his/her upper body alone, the station 10 meets the highest ergonomic requirements.

It is clear that the working area 22 is a three-dimensional space, wherein FIG. 2 merely shows the base area.

The station 10 is preferably formed such that the order-picking person 20 does not need to lift loads during transfer of the piece good 27. As will be described in more detail below, a sliding-surface unit 26 is provided for this purpose. The sliding-surface unit 26 has an L-shape according to the embodiment of FIG. 2 and is arranged between the tray-conveyor system 12 and the piece-good conveyor system 16. The sliding-surface unit 26 is arranged directly adjacent to the conveyor systems 12 and 16. The corners of the sliding-surface unit are rounded, as indicated by means of arrows 28 and 30. It is clear that the shape of the sliding-surface unit 26 is adapted to the relative arrangement of the conveyor systems 12 and 16, or to the relative arrangement of the tray-conveyor system 12 and a packing station 18 (here 90 degree). Further, it is clear that between the sliding-surface unit 26 and the components (12, 14, 16), which are to be connected in terms of material flow, smaller gaps are allowable as long as the to-be-transferred piece good 27 cannot get stuck there.

Further, the station 10 can comprise a tilting device 42, which is not shown in more detail in FIG. 2. The tilting station 42 allows the trays 14, or the piece good 27, to be tilted relative to each other such that the order-picking person 20 can push or pull the piece goods 27 without problems over a circumferential rim (62) of the trays 14 and without the need to lift the piece goods 27 (cf. FIG. 8-10). This will be described below in more detail.

As soon as the order-picking person 20 has taken one of the piece good 27 within the region of the handling position 24, he/she pulls this piece good 27 onto the sliding-surface unit 26 and pushes the piece good 27 towards a discharging area 40, which overlaps, at least partially, the piece-good conveyor system 16, or the packing station 18, and which is located within the working area 22. It is to be noted that the handling position 24 does not need to be located completely within the working area 22. For example, the tilting device 42 can ensure that such piece goods 27, which are located on the trays 14 outside the working area 22, are moved due to gravity into the working area 22 after removal of such piece goods 27, which are located within the working area 22. The surfaces on the tray 14, which are concerned, can be formed correspondingly for this purpose.

The surfaces of the trays 14 can comprise a roughness such that air cushions are formed, during the pulling down of the piece good 27, between the piece goods 27 and surfaces of the tray bottoms, thereby reducing the friction.

It is preferred to conduct the movement of the piece good 27 from the tray(s) 14 in a stepless manner. In this context, stepless means that the order-picking person 20 does not need to lift the piece good 27, i.e. does not need to move in parallel relative to the axis Y in a rapidly changing manner. However, it is permissible that the piece goods 27 may fall down during the transfer. In this case, the order-picking person 20 does not carry out work, i.e. he/she does not need to lift the piece good 27. If the order-picking person 20 removes the piece goods 27, for example, from one of the trays 14-1 and 14-2, pulls them over the sliding-surface unit 26 and moves them towards the discharging area 40, where a to-be-loaded shipping support is provided in a packing station 18, it might happen that the shipping carrier or the piece goods 27, which have already been loaded onto the shipping carrier, are located deeper than the sliding-surface unit 26 so that the piece good 27 in the region of the shipping carrier fall down or are tilted. Nevertheless, the movement occurs in this case in a "stepless" manner in accordance with the invention.

Figure 3:
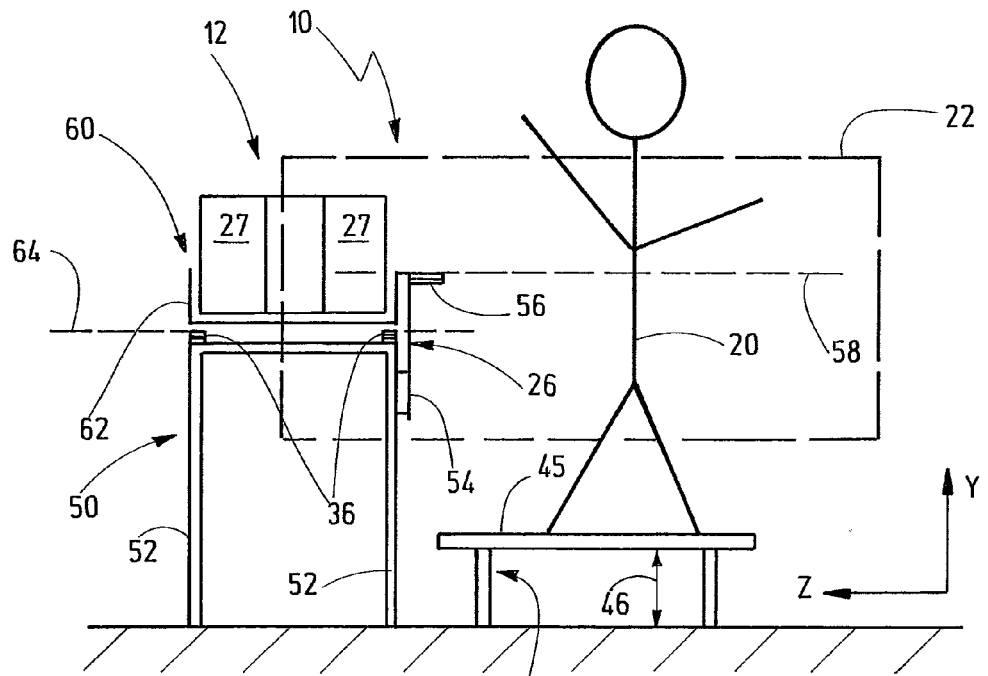
FIG. 3 shows a first side view of the tray-handling station of FIG. 2.

Referring to FIG. 3 the station 10 of FIG. 1 is laterally shown along the positive direction X.

Depending on the size of the order-picking person 20 (man or woman) a platform 44 can be used within the working area 22, which can be adjusted in height, as indicated by means of a double arrow 46. Then, the order-picking person 20 stands on a contact surface 45 of the platform 44. The contact surface 45 is dimensioned such that the order-picking person 20 can comfortably move within the working area 22. The order-picking person 20 is allowed to walk. A height of the platform 44 is selected such that the order-picking person 20 gets the piece goods 22 served at a height at which the order-picking person 20 can comfortably work without the need to bend over or to lift the piece goods 27. The height of the platform 44, which is to be adjusted, depends further on a height of the tray-conveyor system 12.

The tray-conveyor system 12 can comprise a frame 50 having legs 52. The (transport) belts 36 can be arranged on a top side of the frame 50, the belts carrying the trays 14. For the sake of a better overview the tilting device 42 of FIG. 2 is not shown in FIG. 3. The same applies with regards to the piece-good conveyor system 16 and the packing station 18, an upper rim of which is nevertheless arranged, preferably, at the height of a handling plane 58, which is indicated in FIG. 3 by means of a dashed line.

The handling plane 58 is preferably orientated horizontally, i.e. the plane lies in the plane XZ. In this case the handling plane 58 represents a plane without elevations or depressions. However, the handling plane 58 can also be tilted relative to a horizontal plane (plane XZ) and can comprise depressions—but no elevations—towards the discharging area 40.

Amongst other things, an orientation of the handling plane 58 is defined by the sliding-surface unit 26. The sliding-surface unit 26 comprises, for example, a horizontally orientated sliding surface 56 and a vertically orientated skirt 54. The sliding surface 56 and the skirt 54 enclose a right angle, wherein the sliding surface 56 protrudes towards the order-picking person 20. It is clear that the skirt 54 can also be displaced towards the order-picking person 20 such that protruding or overhanging edges are not present, where the order-picking person 20 could get injured. The top side of the sliding surface 56 is preferably flush-adjacent to an upper edge 60 of the circumferential rim 62 of the trays 14. As will be explained in more detail below, either the piece goods 27 or the tray 14 are/is tilted relative to a main-conveying plane 54, which is orientated in parallel to a horizontal plane (plane XZ) such that the piece goods 27 do not need to be lifted for being moved from the trays 14 towards the discharging area 40 (cf. FIG. 2). The situation as shown in FIG. 3 with regard to the piece goods 27 represents a step in terms of the present description.

The handling plane 58 is preferably located within a region including the hip and the belly of the order-picking person 20. The handling plane 58 is particularly arranged at a height, which is defined by forearms which are right-angled (cf. FIG. 5).

Further, FIG. 3 shows that the working area 22 can also extend in the height direction (direction Y). The working area, or the working space, 22 is dimensioned such that the order-picking person 20 can comfortably move at least his/her arms, when the order-picking person 20, for example, slightly rotates about his/her longitudinal axis (axis Y).

Figure 4:
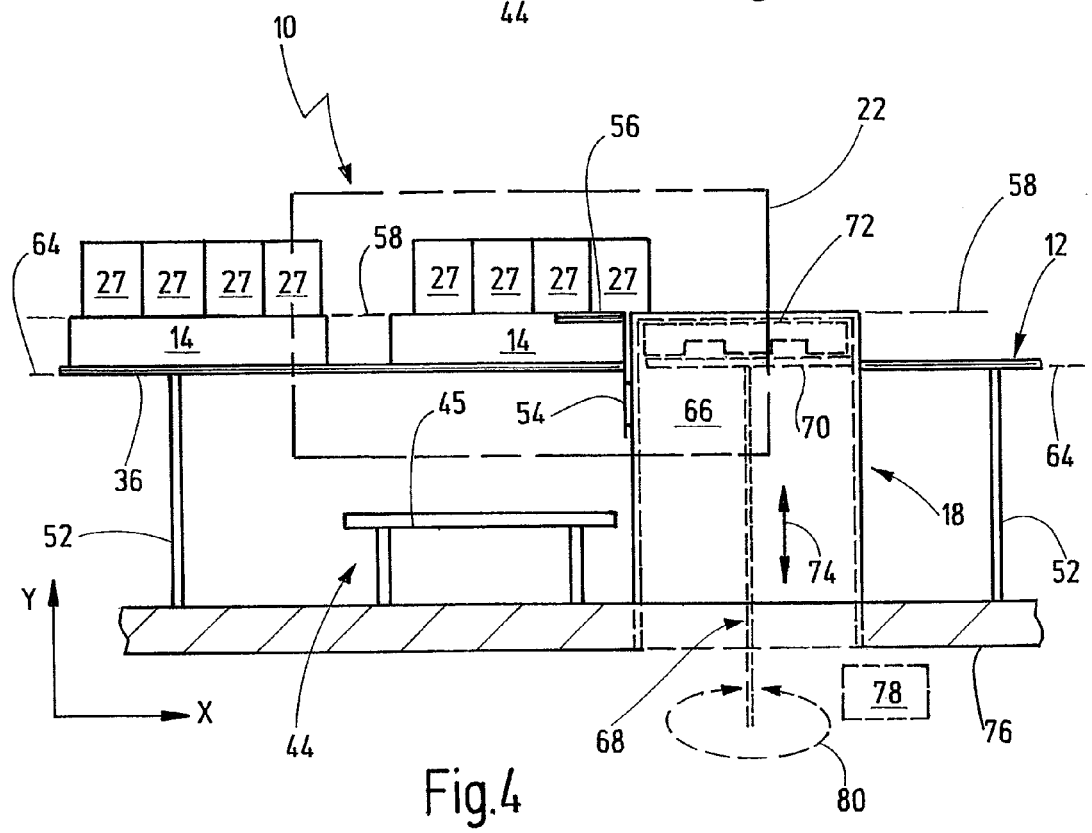
FIG. 4 shows a second side view of the tray-handling station of FIG. 2.

With reference to FIG. 4 an additional side view of the station 10 of FIGS. 2 and 3 is shown wherein the order-picking person 20 is not shown in FIG. 4 and wherein the packing station 18 is exemplarily shown instead of the piece-good conveyor system 16.

The packing station 18 is illustrated semi-transparent so that an inner (packing) shaft 66 can be recognized. The shaft 66 is defined by one or more outer walls of the packing station 18 and is dimensioned such that sufficient space for receiving a lifting device 68 is present, the lifting device 68 comprising a lifting platform 70. The lifting platform 70 is preferably orientated horizontally and serves for receiving shipping carriers such as a shipping pallet 72, which can be moved variably upwards and downwards by means of the lifting device 68, as indicated by means of a double arrow 74. The lifting device 68 is arranged at a (height) level (axis Y) beneath the station 10. The station 10 can be arranged on a platform 76 which is open within the region of the packing station 18. A wrapping device 78 can be arranged beneath the platform 76, the wrapping device 78 strongly wrapping a (thermal) foil, as indicated by means of an arrow 80, around the shipping pallet 72, which is packed with the piece good 27.

The orientation and position of the handling plane 58 can be selected such that the plane is flush-adjacently arranged to a top side of at least a part of the sliding surface 56, the part extending along the packing station 18.

Figure 5:
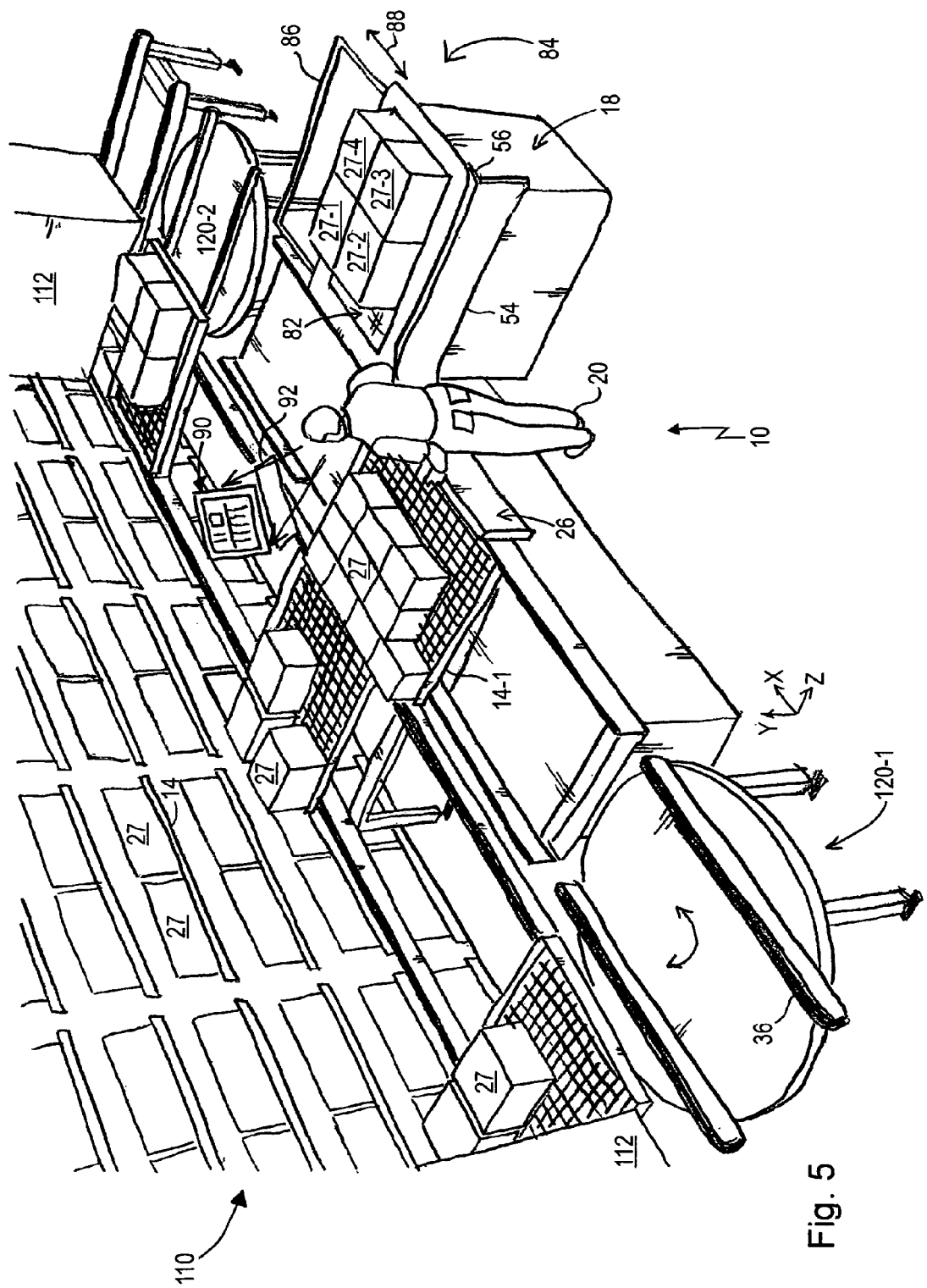
FIG. 5 shows a perspective view of another tray-handling station of the invention.

An additional tray-handling station 10 having a packing station 18 is shown in a perspective view in FIG. 5. Components of the storage and order-picking system 100, in particular the tray warehouse 110 as well as two vertical elevators 112, can be recognized.

The tray conveyor system 12 comprises a relatively complex course. The tray-conveyor system 12 comprises, amongst other things, two turntables 120, which are needed for transferring the trays 14 between linear sections of the tray-conveyor system 12. The tray-conveyor system 12 forms a conveyor loop between the elevators 112 and the tray-handling station 10. The correspondingly formed loop can also serve as a buffer for the trays 114, which are stored and retrieved via the elevators 112.

One tray 14-1 is shown directly in front of the order-picker 20 in the handling position 24 (cf. FIG. 2), the tray 14-1 being tilted relative to a horizontal plane (plane XZ) by means of the tilting device 42 (cf. FIG. 2). The piece goods 27 are tilted on the tray 14-1 towards the order-picking person 20. In this manner the piece goods 27 can be moved easily towards the order-picking person 20 due to gravity. Preferably, the piece-goods 27, by themselves, slide towards the order-picking person 20. The order-picking person 20 can move the piece goods 27, which are provided in this manner, from the tray 14-1 via the sliding-surface unit 26 towards the packing station 18, a shaft opening of which matches in this case the discharging area 40 (cf. FIG. 2). In this case the skirt 54 and the sliding surface 56 of the sliding-surface unit 26 are arranged relative to each other such that edges do not exist, which protrude towards the order-picking person 20. The sliding surface 56 is further flush-coupled to an upper rim of the packing station 18. The upper rim of the packing station 18 preferably surrounds the shaft opening completely and lies in the plane XZ. This rim can serve as a place to put something as well as a stacking support. The sliding surface 56 represents kind of a widening or extension of the circumferential rim of the packing station 18.

Already four piece goods 27, which do not need to be of one sort only, have been loaded into the packing station 18 in the example of FIG. 5. These four piece goods 27-1 to 27-4 are standing on a horizontally movable (intermediate) surface 82, which is part of a shipping-carrier exchanging device 84, wherein FIG. 4 only shows a horizontally orientated frame 86 thereof. The surface 82 is located within the frame 86 in a normal position and can travel across the shaft opening, when a loaded shipping carrier is exchanged for an empty shipping carrier, in order to be moved into an exchanging position, as indicated by means of an arrow 88. As soon as a new empty shipping carrier is positioned beneath the surface 82, the surface 82 can be withdrawn from the exchanging position thereof returning to the normal position thereof, i.e. into the frame 86. In this case, the four piece-goods 27-1 to 27-4 fall onto the empty shipping carrier (which is not depicted). In this manner it can be ensured that the order-picking person 20 can continue to work, i.e. without an interruption and pause, even if the shipping carrier is exchanged. This increases the transferring performance of the order-picking person 20 (transferred piece goods 27/hour).

In general, the tray-handling station 10 can comprise a displaying device 90 such as a (computer) screen and, if necessary, also an input device 92 such as a keyboard or the like. Important information can be communicated to the order-picking person 20 via the screen, which is preferably arranged within the direct field of vision of the order-picking person, as indicated in FIG. 5 by means of two arrows, the information being required for handling the piece goods 27. In this way, for example, photos of the piece goods 27 can be displayed to the order-picking person 20, which need to be taken by him/her from the tray 14-1. Further, computer graphics can be displayed to the order-picking person 20 explaining how to arrange the removed piece good 27-1 within the packing station 18 for continuing a stack of piece goods. If errors or unexpected complications occur, the order-picking person 20 can communicate with a superordinated control (e.g., material flow computer, warehouse management computer, etc.) via the input device 92.

The superordinated control is responsible, amongst other things, for the material flow within the system 100, and in particular for the flow of the trays 14 from and to the station 10. Further, the superordinated control can calculate in advance a packing pattern on the shipping carrier by means of packing algorithm and packing software. The order-picking person 20 is relieved by this measure during the packing process. The order-picking person 20 does no longer need to test in a complicated manner how the presently to-be-packed piece good 27 fits best onto the stack of piece goods in the packing station 18. In this manner, also time can be saved during the packing process. In this way the stack of piece goods can be formed more stable and compact. The packing algorithms can also take into account an unloading sequence of the stack of piece goods at the customer's destination.

The tray-handling station 10 shown in FIG. 5 is highly ergonomical. The order-picking person 20 actually does not need to walk for removing the piece goods 27 from the tray 14-1 and for putting same on the stack of piece goods in the packing station 18. In this case, the order-picking person 20 pulls the piece goods 27 from left to right over the sliding-surface unit 26. The order-picking person 20 does not need to lift the piece goods 27. The packing pattern is displayed to the order-picking person 20 via the screen, which in turn is arranged centrally between the tray 14-1 and the packing station 18. The piece goods 27 are provided preferably within hip to belly height of the order-picking person 20. The piece goods 27 slide, preferably alone, into the working area 22 (cf. FIGS. 2 to 4) of the order-picking person 20 so that the order-picking person 20 does not need to stretch for also getting to the piece goods 27 which—from the order-picking person's 20 view—are placed in a rear region of the tray 14-1, or outside the working area 22.

Figure 6:
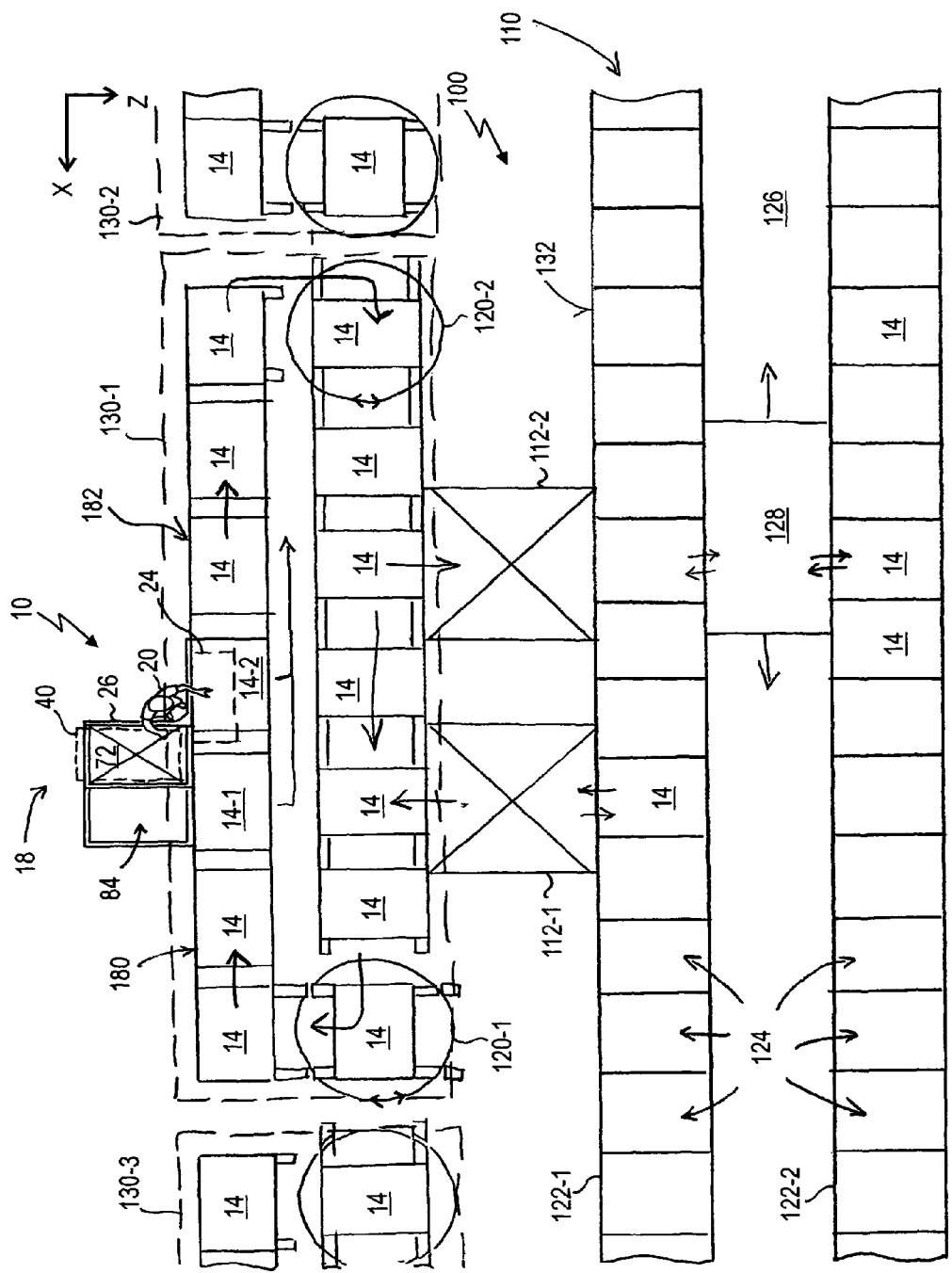
FIG. 6 shows a top view of another storage and order-picking system having another tray-handling station of the invention.

FIG. 6 shows a top view of a system 100 having another station 10 and a tray warehouse 110.

The tray warehouse 110 exemplarily comprises two racks 122, wherein FIG. 6 merely shows single racks 122-1 and 122-2. The racks 122 comprise a plurality of storage positions 124 dedicated to the trays 14. The storage positions 124 are arranged like a matrix in rows and columns side-by-side and on top of each other, and are supplied with the trays 14 via a storage and retrieval device 128. The storage and retrieval device 128 travels in a rack aisle 126 which is defined between the racks 122-1 and 122-2 along the longitudinal direction (direction X). The storage and retrieval device 128 can be supported by the racks 122. However, the storage and retrieval device 128 can also be guided on a bottom and/or ceiling of a facility. One load-handling device of the storage and retrieval device 128 is adapted to receive and deliver a number of trays 14 in the transversal direction (direction Z). Specific storage locations 124, which are arranged oppositely to the elevator 112, represent so-called transfer positions where the load-handling device of the elevators 112 exchanges the trays 14 with the rack 122 in the transversal direction Z. The elevator 112-1, which is shown at the left hand side of FIG. 6, conveys the trays 14 (exclusively) in the vertical direction to a level of the tray-handling station 10, and then discharges the tray 14 to the tray-conveyor system 12, which is provided in the present case, preferably again in terms of a closed conveyor loop 130-1. The conveyor loop 130-1 comprises linear sections and turntables 120. It is clear that the conveyor loop 130-1 can comprise, dependent on the course of line, curved sections (not shown) and/or downgrades and upward inclinations (not shown).

In this case, the trays 14 are transported from the (retrieval) elevator 112-1 to the station 10 towards the handling position 24, where the order-picking person 20 removes a desired number of the piece goods 27 and moves same over the sliding-surface unit 26 into the discharging area 40, which covers a shaft opening of the packing station 18. After the removal of the piece goods 27 has been completed, which are preferably provided by one sort only on the trays 14, the corresponding trays 14 are transported towards the (storage) elevator 112-2. However, the trays can also circulate one more time, if the piece goods 27 are needed once again in another (stack) layer on the shipping pallet 72. It is clear that also other (shipping) load supports, instead of pallets, can be used. For example, rolling containers, boxes, cartons, containers, pallets of different sizes, and the like can be used. Further, each of the elevators 112 can be used as storage elevator and/or retrieval elevator.

Further, two additional conveyor loops 130-2 and 130-3 are shown in FIG. 6, the conveyor loops enclosing the conveyor loop 130-1 therebetween. An arbitrary number of stations 10 having associated tray-conveyor systems 12 can be arranged side-by-side along a longitudinal side 132 of the tray warehouse 110.

Figure 7:
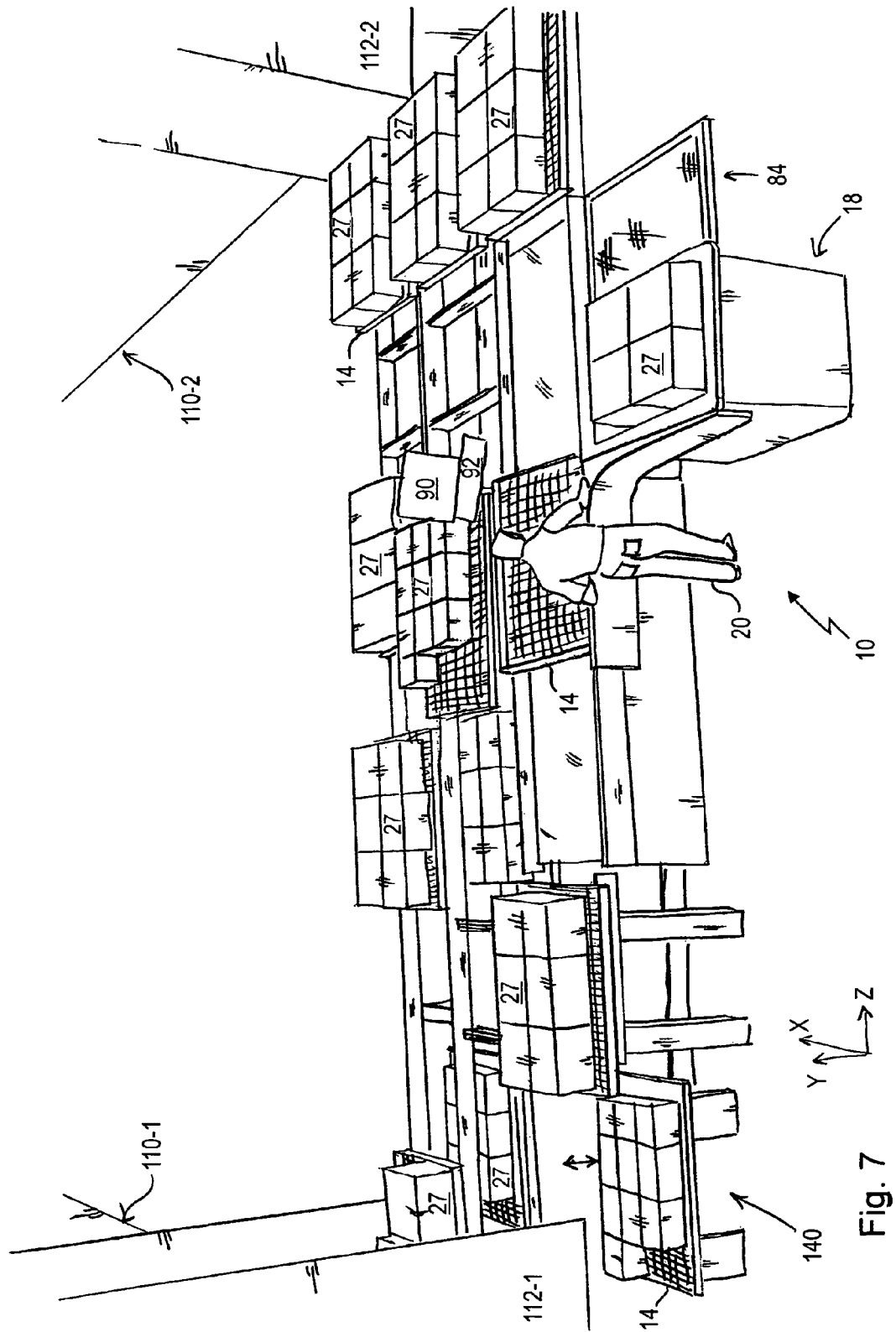
FIG. 7 shows a perspective view of another modification of a tray-handling station of the invention.

Alternatively, the stations 10, however, can also be arranged in the transversal direction (direction Z) between two adjacent tray warehouses 110-1 and 110-2, as exemplarily shown in FIG. 7 in a perspective view into an aisle extending between two tray warehouses 110-1 and 110-2 in the longitudinal direction (direction X). Another advantage of this kind of arrangement is to be seen in that access to one range of piece goods from two different tray warehouses 110-1 and 110-2 is possible at the station 10.

The tray-conveyor system 12 can be provided in two planes arranged on top of each other. Each of the planes can be associated with one of the elevators 112-1 and 112-2. One of the planes preferably serves for providing the trays 14, from which the piece goods 27 are to be removed. The other plane preferably serves for transporting back the trays 14 which have already been processed. It is clear that the material flow can also be inverted or mixed.

Additional conveyor-system components such as lifting apparatus 140, which is exemplarily shown in FIG. 7 in the lower left corner thereof, can be provided for allowing exchanging the trays 14 between both of the planes.

It is clear that the trays 14 cannot only be delivered to the order-picking person via horizontally arranged loops, but also via vertically orientated conveyor loops. the vertically orientated loops can be arranged between two adjacent tray warehouses 110, as exemplarily shown in FIG. 7. Alternatively, the vertical loops can also be arranged in parallel to the longitudinal side 132 of one or more tray warehouses 110, as exemplarily shown in FIG. 6.

Figure 8:
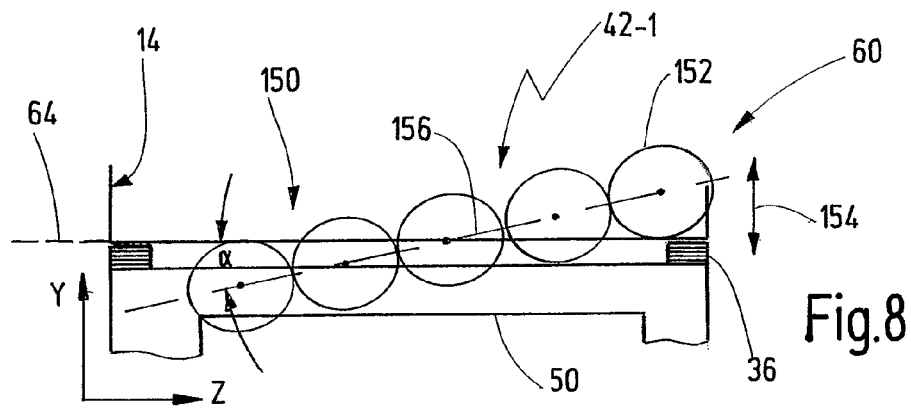
FIG. 8 shows a schematic side view of a first tilting device.
Figure 9:
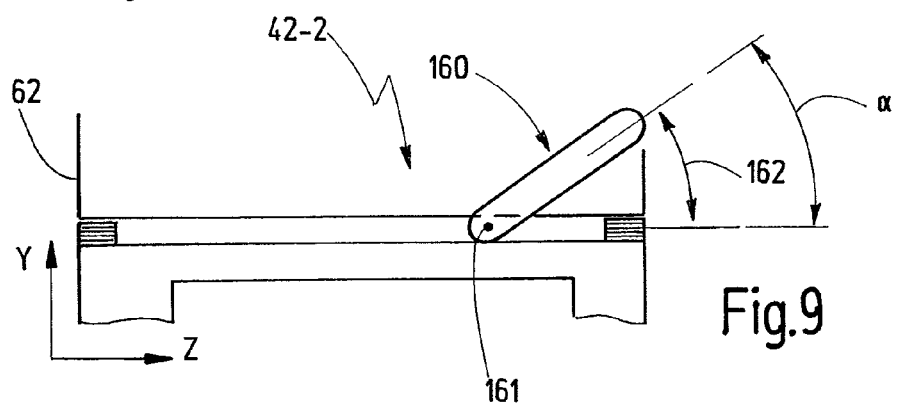
FIG. 9 shows a schematic side view of a second tilting device.
Figure 10:
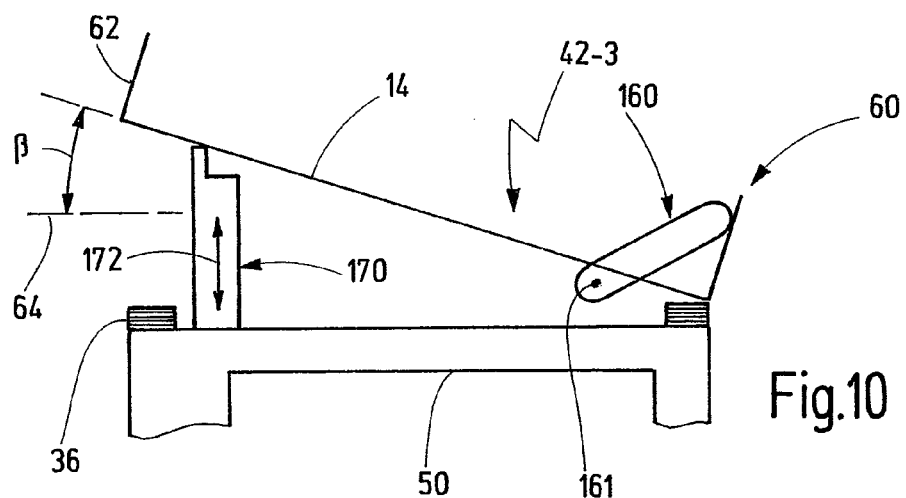
FIG. 10 shows a schematic side view of a third tilting device.

Several modifications of a tilting device 42 are shown in FIGS. 8 to 10.

FIG. 8 shows a first tilting device 42-1 comprising a plurality of rollers 152, which in turn can reach through corresponding openings in the bottoms of the trays, as indicated by means of an arrow 154. The rollers 152 can be extracted and retracted in the vertical direction (direction Y), preferably in a variable manner. In particular, the rollers 152 can be orientated along an imaginary plane 156, which is inclined relative to the main-conveying plane 64 (cf. angle $\alpha$). The plane 156 is preferably inclined such that the piece goods 27 (not shown) can be moved on the rollers 152 over the upper edge 60 of the tray 14, without requiring the order-picking person 20 (not shown), who stands in the example of FIG. 8 at the right beside the tray 14, to lift these piece goods over the rim 62 of the tray 14.

The tilting device 42-2, which is shown in FIG. 9, is provided at least with one finger element 160, which is pivotable about an axis 161 in a region of the rim 62, as indicated by means of an arrow 162. Typically, a number of finger elements 160 is arranged one behind the other in the direction X and is actuated synchronously for facilitating the removal of one of the piece goods 27 (not shown) from the tray 14 to the order-picking person 20 (not shown). In the extracted position, as shown in FIG. 9, an imaginary extension of the surface of the finger element 160 beyond the upper edge 60 of the rim 62 of the tray 14 is sufficient. In a retracted position, the trays 14 can travel in the direction X.

Another modification of a tilting device 42-3 is shown in FIG. 10, which has a similar structure like the tilting device 42-2 shown in FIG. 9.

The tilting device 42-3 has one or more lifting pins 170, additional to the finger element 160, which are extracted and retracted in a region of the tray 14 oppositely to the finger element 160, preferably in parallel to the direction Y. The tray 14 itself is tilted towards the order-picking person 20 by means of the lifting pin 170, as indicated by means of an angle $\beta$.

Both the angle $\alpha$ and the angle $\beta$ can be adjusted dependent on the piece goods and/or the tray. Angles having different sizes can be adjusted arbitrarily.

It is clear that the conveying means, i.e. the belt 36 in the present case, of the tray-conveyor system 12 can also be arranged directly on the lifting pins 170 for guiding the trays 14 past the tray-handling station 10 (in a clocked manner) in an oblique position.

Figure 11:
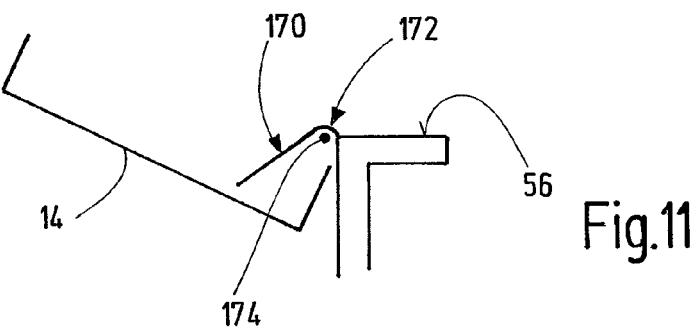
FIG. 11 shows a schematic side view of an alternative chute.

It is clear that, instead of retractable aids in accordance with the element 150 or 160, a chute 170, which can be actuated manually or mechanically, can be used, as exemplarily shown in FIG. 11. The chute 170 is supported rotatably about an axis 174 by means of a pivot bearing 172. A first end position is shown in FIG. 11, where the chute 170 reaches into the tray 14. In a second end position, which is not depicted, the chute 170 can rest on the sliding surface 56 for allowing exchanging one of the trays 14. In this second end position the chute is pivoted about more than 180 degree. Other smaller angles are possible as long as the chute 170 does not collide with the tray 14 during the exchange of the tray. The pivoting process between both of the end positions can be carried out in an automated manner by means of a pivot link, which is not shown and which can be actuated due to a tray exchange. In this case, the chute 170 is always in the second end position, if a tray exchange occurs.

Returning to FIG. 6 a tilting-forward device 180 is shown in front of the station 120, and a tilting-back device 182 is provided behind the station 10, the devices tilting the trays 14 towards the order-picking person 20 in accordance with the manner described with reference to FIG. 10, and tilting them back into the main conveyor plane 64. The tray-conveyor system 12 is preferably inclined within a region, which can receive at least two of the trays 14 and is arranged immediately adjacent to the station 10. In FIG. 6 the trays 14-1 and 14-2 are located in this region. This region overlaps the handling position 24. Preferably, at least two of the trays 14 are transferred in common for exchanging the tray(s) 14 at the handling position 24.

It is clear that the explanations above with regard to the removal of one of the piece goods 27 and the packing of this piece goods 27 onto the shipping load or the transferring onto a piece-good conveyor system 16 also apply in an inverted manner. In this way, for example, the piece goods 27 can be fed to the station 10 (individually) via the piece-good conveyor system 16. Stacks of piece goods on load supports can be fed via the packing station 18. The piece goods 27, which are fed in this manner, can then be transferred manually by the order-picking person 20 onto the trays 14, wherein the order-picking person 20 moves the piece goods 27 over the sliding-surface unit 26. In these cases, the sliding-surface unit 26 is most times formed with a straight plane, i.e. the sliding surface unit 26 neither comprises elevations nor depressions so that piece goods can be moved over the sliding surface 56 in both directions (loading and unloading).

Further, it is clear that the trays 14 do not need to be loaded with piece goods 27 of one sort only. The shipping carriers can also be loaded with different types of piece goods as well. In this context, one speaks of "mixed pallets", if pallets are used as the shipping carriers. Of course, trays 14 of one sort only as well as shipping carriers of one sort only can also be loaded and unloaded at the station 10.

Figure 12:
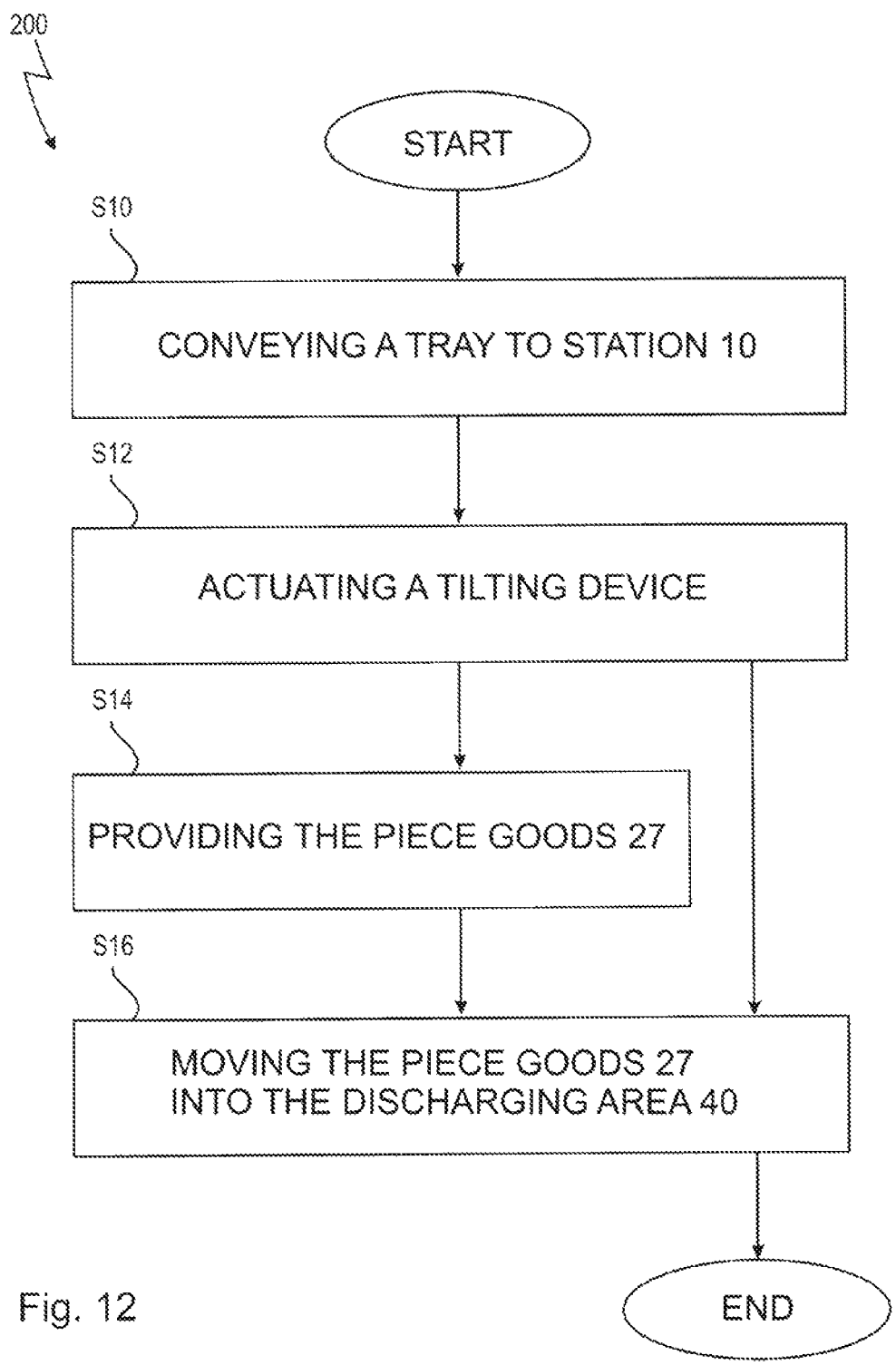
FIG. 12 shows a flow chart of a method of the invention.

With reference to FIG. 12 a method 200 for loading or unloading a piece good 27 on or from a tray 14 is described below.

In a first step S10 to-be-handled trays 14 are conveyed to the tray-handling station 10, and in particular to the handling position 24. In a step S12 a tilting device 42 can be actuated for positioning either the tray 14 and/or the piece goods 27 obliquely. The to-be-handled piece goods 27 are provided either already in the step S12 due to the provision of the trays 14, or separately in step S14, for example, if the trays 14 are to be loaded. In step S16 the piece goods 27 are moved over the sliding surface 56 of the sliding-surface unit 26 into the discharging area 40. The movement is performed by pulling and/or pushing the piece goods 27, namely without lifting the piece goods 27 for this purpose. It is clear that during the loading of the trays 14 the discharging area 14 overlaps the handling position 24.

Further, it is also possible, supplementary or alternatively, to use a pusher or elements having similar functions such as a device for unloading trays in accordance with DE 10 2006 039 679 A1, upstream relative to the tilting device 42, which arrange the piece goods, which are provided on the trays, in advance in an ergonomically good position on the tray, so that the order-picking person needs to move as less as possible. Then, the piece goods are preferably pushed towards the order-picking person.

In general, in the above description the typical designation used in the field of intralogistics was considered for the selection of orientation directions so that the (horizontal) length along a longitudinal side of the rack has been designated by X, the depth of a rack has been designated by Z and the (vertical) height of a rack has been designated by Y.

Further, in the above description of the invention identical parts and features have been provided with identical reference numerals, wherein the disclosure contain within the entire description can be transferred onto identical parts and features having identical reference numerals. Positional and orientational information such as "above", "below", "laterally", "longitudinally", "transversal", horizontal", "vertical" and the like are referring to the immediately described figure and are to be transferred to a new position and orientation if position and orientation changes.

Therefore, what is claimed is:

1. A tray-handling station for manually unloading piece goods by an order-picking person from a tray onto a pallet in a packing station, wherein the tray-handling station is coupled to the packing station, the tray-handling station comprising:
   a tray-conveyor system comprising a handling position for buffering at least one tray, which is to be handled and carries the piece goods;
   a working area including, at least partially, the handling position, and the packing station; and
   a sliding-surface unit having a substantially horizontal surface that is arranged adjacent to the tray-conveyor system, and adjacent to the packing station;
   wherein the to-be-handled tray has a top surface for supporting at least one of the piece goods during the unloading of the at least one piece good form the to-be-handled tray located at the handling position, the top surface of the to-be-handled tray being no lower than the sliding surface of the sliding surface unit; and
   wherein the working area is dimensioned so that, during unloading of the at least one piece good from the to-be-handled tray located at the handling position, the order-picking person moves the to-be-removed piece good from the to-be-handled tray over the sliding surface to a discharging area, which is located within the working area and which, at least partially, overlaps the packing station, such that, during the unloading, the order-picking person moves the piece good from the to-be-handled tray to the discharging area by pulling or pushing only, and only by moving his/her upper body without lifting.

2. The tray-handling station of claim 1, further comprising a tilting device configured to tilt the to-be-handled tray, or the to-be-removed piece good, relative to a substantially horizontally orientated main-conveying plane, which is defined by the tray conveyor system, so that the order-picking person pushes and pulls the to-be-removed piece good over the sliding surface of the sliding-surface unit in a substantially stepless manner from the to-be-handled tray to the discharging area.

3. The tray-handling station of claim 2, wherein the tilting device comprises a tilting-forward device and a tilting-back device, which are integrated into the tray-conveyor system so that they are arranged upstream and downstream relative to the handling position.

4. The tray-handling station of claim 3, wherein a bottom of the to-be-handled tray is tilted relative to the main-conveying plane so that the piece goods slip towards the order-picking person.

5. The tray-handling station of claim 4, wherein the tilting device further comprises a ramp, which is configured to be lifted and lowered, to reach through the to-be-handled tray and to be tilted oppositely to the bottom of the tray.

6. The tray-handling device of claim 2, wherein the tilting device comprises an array of rollers, which defines a transport plane and which reaches through a bottom of the to-be-handled tray such that the transport plane is tilted relative to the main-conveying plane.

7. The tray-handling station of claim 1, wherein the sliding-surface unit is flush-coupled to the tray-conveyor system and to the packing station.

8. The tray-handling system of claim 1, wherein the sliding-surface unit includes first and second legs forming the sliding surface, the first leg extending in a longitudinal direction along and adjacent to the tray-conveyor system, the second leg extending transversely to the first leg and adjacent the packing station, and the legs defining therebetween a region in which the order-picking person can be positioned.

9. The tray-handling device of claim 1, wherein the sliding-surface unit comprises a skirt, which is substantially orientated vertically and ends with an edge of the sliding surface in a flush manner, the edge facing the order-picking person.

10. The tray-handling station of claim 1, wherein the sliding surface decreases from the tray-conveyor system towards the packing station.

11. The tray-handling station of claim 1, wherein the tray-conveyor system is configured to be moved in a clocked manner, at least within the working area, and wherein the handling position is defined by a section of the tray-conveyor system, where the to-be-handled tray rests during removal or delivery of one of the piece goods.

12. The tray-handling station of claim 1, wherein each of the trays has a circumferential rim so that the piece goods cannot slip-off laterally from a transport area of the tray.

13. The tray-handling station of claim 1, wherein each of the trays is adapted to receive one pallet layer, or pallet row, of the piece goods.

14. The tray-handling station of claim 8, wherein the first and second legs of the sliding surface unit enclose an angle of about 10 to 170 degree.

15. A storage and order-picking system having a tray warehouse and a tray-handling station for manually unloading piece goods by an order-picking person from a tray onto a pallet in a packing station, the tray-handling station comprising:
   a tray-conveyor system comprising a handling position for buffering at least one tray, which is to be handled and carries the piece goods;
   a working area including, at least partially, the handling position, and the packing station; and
   a sliding-surface unit having a substantially horizontal sliding surface that is arranged adjacent to the tray-conveyor system, and adjacent to the packing station;
   wherein the to-be-handled tray has a top surface for supporting at least one of the piece goods during the unloading of the at least one piece good from the to-be-handled tray located at the handling position, the top surface of the to-be-handled tray being no lower than the sliding surface of the sliding surface unit; and
   wherein the working area is dimensioned so that, during unloading of the at least one piece good from the to-be-handled tray located at the handling position, the order-picking person moves, the to-be-removed piece good from the to-be-handled tray over the sliding surface to a discharging area, which is located within the working area and which, at least partially, overlaps the packing station, such that, during the unloading, the order-picking person moves the piece good from the to-be-handled tray to the discharging area by pulling or pushing one, and only by moving his/her upper body without lifting.

16. A method for loading or unloading piece goods in a storage and order-picking system having a tray-handling station for manually unloading the piece goods by an order-picking person from a tray onto a pallet in a packing station, wherein the tray-handling station is coupled to the packing station, the tray-handling station comprising: a tray-conveyor system comprising a handling position for buffering at least one tray, which is to be handled and carries the piece goods; a working area including, at least partially, the handling position, and the packing station; and a sliding-surface unit having a substantially horizontal sliding surface that is arranged adjacent to the tray-conveyor system, and adjacent to the packing station; wherein the to-be-handled tray has a top surface for supporting at least one of the piece goods during the unloading of the at least one piece good from the to-be-handled tray located at the handling position, the top surface of the to-be-handled tray being no lower than the sliding surface of the sliding surface unit; and wherein the working area is dimensioned so that, during unloading of the at least one piece good from the to-be-handled tray located at the handling position, the order-picking person moves the to-be-removed piece good from the to-be-handled tray over the sliding surface to a discharging area, which is located within the working area and which, at least partially, overlaps the packing station, such that, during the unloading, the order-picking person moves the piece good from the to-be-handled tray to the discharging area by pulling or pushing only, and only by moving his/her upper body without lifting, the method comprising the steps of:
   conveying the to-be-handled tray to the handling position of the tray-conveyor system;
   providing the to-be-handled piece good within the working area of the order-picking person so that the order-picking person can transfer the piece good only by moving his/her upper body without lifting; and
   pulling or pushing the piece good from the to-be-handled tray over the sliding surface of the sliding-surface unit to the discharging area located within the working area.

* * * * *